United States Patent
Knittel

(10) Patent No.: US 8,228,776 B2
(45) Date of Patent: Jul. 24, 2012

(54) APPARATUS WITH A PICKUP FOR READING DATA FROM OR WRITING DATA TO AN OPTICAL STORAGE MEDIUM

(75) Inventor: Joachim Knittel, Tuttlingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 337 days.

(21) Appl. No.: 12/587,848

(22) Filed: Oct. 14, 2009

(65) Prior Publication Data

US 2010/0103800 A1    Apr. 29, 2010

(30) Foreign Application Priority Data

Oct. 24, 2008    (EP) ..................................... 08305724

(51) Int. Cl.
*G11B 7/097* (2006.01)
(52) U.S. Cl. ................................. 369/112.23
(58) Field of Classification Search ............. 369/112.23
See application file for complete search history.

(56) References Cited

U.S. PATENT DOCUMENTS

| 5,153,873 | A | * | 10/1992 | Spruit et al. ............... 369/275.2 |
| 5,365,052 | A | | 11/1994 | Yanagisawaz et al. |
| 5,802,036 | A | | 9/1998 | Ohba et al. |

FOREIGN PATENT DOCUMENTS

EP    0 343 727 A    11/1989

OTHER PUBLICATIONS

Search Report dated Feb. 12, 2009.

* cited by examiner

*Primary Examiner* — Aristotelis Psitos
(74) *Attorney, Agent, or Firm* — Myers Wolin, LLC

(57) ABSTRACT

The apparatus comprising a pickup for reading data from or writing data to an optical storage medium, wherein the pickup comprises a laser providing a laser beam, an objective lens for focusing the laser beam onto the optical storage medium, a first detector and a beam splitter arranged between the laser and the objective lens for guiding light reflected from the optical storage medium onto the first detector. A selecting means, arranged in front of the beam splitter, with regard to the reflected light from the optical storage medium, is provided for guiding reflected light passing through an outer section of the objective lens onto a second detector. The light guided onto the first detector is utilized for providing a tracking error signal and the light guided onto the second detector is utilized for providing a data signal.

8 Claims, 2 Drawing Sheets

APPARATUS WITH A PICKUP FOR READING DATA FROM OR WRITING DATA TO AN OPTICAL STORAGE MEDIUM

TECHNICAL FIELD OF THE INVENTION

This application claims the benefit, under 35 U.S.C. §119, of European Patent Application No. 08305724.0 filed 24 Oct. 2008.

The invention relates to an apparatus with a pickup comprising a laser, an objective lens, a first detector and a beam splitter arranged between the laser and the objective lens for guiding light reflected from an optical storage medium onto the first detector. The optical storage medium is in particular an optical disc comprising a super resolution near-field structure for providing a high data density.

BACKGROUND OF THE INVENTION

Optical storage media are media in which data are stored in an optically readable manner, for example by means of a laser and a photo-detector being integrated within a pickup. The photo-detector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to 50 GB on a dual layer disc. For reading and writing of a Blu-Ray disc an optical pickup with a laser wavelength of 405 nm is used. On the Blu-Ray disc a track pitch of 320 nm and a mark length from 2T to 8T and 9T is used, where T is the channel bit length, and which corresponds with a minimum mark length of 138-160 nm. The re-writable BD-RE disc is based on a phase change technology comprising a phase change layer, which uses for example a compound of AgInSbTe or GeSbTe. Further information about the Blu-Ray disc system is available for example from the Blu-Ray group via internet: www.blu-raydisc.com.

New optical storage media with a super resolution near-field structure (Super-RENS) offer the possibility to increase the data density of the optical storage medium by a factor of two to four in one dimension as compared with the Blu-Ray disc. This is possible by a so-called Super-RENS structure, which is placed above a data layer of the optical storage medium, and which significantly reduces the effective size of a light spot used for reading from or writing to the optical storage medium. The super resolution layer is a non-linear layer which is also called a mask layer because it is arranged above the data layer and for some specific materials only the high intensity center part of a laser beam can penetrate the mask layer. Materials applicable as a Super-RENS structure are for example phase-change materials from which it is known that they become transparent when they are heated by a laser. Applicable are also some semiconductor materials which show a strong increase in reflectivity for higher laser intensities, the reflectivity being dependent on the pit structure of a corresponding data layer of the storage medium.

U.S. Pat. No. 5,365,052 discloses an apparatus with an optical system for reading information on an optical storage medium, wherein the effective numerical aperture of the light receiving optical system is larger than the effective numerical aperture of the focusing optical system. The focusing optical system includes an objective lens and the light receiving optical system includes a light receiving means disposed around the objective lens for receiving reflected light not passing through the objective lens.

U.S. Pat. No. 6,920,091 describes an apparatus comprising a pickup having a first and a second light shade for separating reflected light of an optical disc into a center portion and a peripheral portion, wherein the light of the center portion is exclusively used for signal reproduction, so that the signal-to-noise ratio is increased. The optical disc is an aperture type Super-RENS optical disc.

U.S. Pat. No. 5,802,036 discloses an apparatus with a pickup utilizing a super-resolution technique with a super-resolution filter for weakening the light intensity of the center portion of light passing through the objective lens, which reduces the size of the light spot on the optical storage medium. The reflected light is collected by the objective lens with a larger numerical aperture with regard to the laser beam impinging on the optical storage medium.

BRIEF SUMMARY OF THE INVENTION

The apparatus comprises a pickup for reading data from or writing data to an optical storage medium, the pickup comprising a laser and an objective lens for focusing the laser beam onto the optical storage medium, and comprising a first detector and a beam splitter for guiding light reflected from the optical storage medium onto the first detector. A selecting means, arranged in front of the beam splitter, with regard to the reflected light from the optical storage medium, is provided for guiding reflected light passing through an outer section of the objective lens onto a second detector. The light guided onto the first detector is utilized for providing a tracking error signal and the light guided onto the second detector is utilized for providing a data signal.

The data signal is therefore exclusively or essentially provided by the outer section of the objective lens when reading data from the optical storage medium. Because an essential part of the laser light impinging on the optical storage medium and not contributing to the data signal is reflected under no or only a small angle back to the objective lens and the reflected light responsive to the data signal is reflected under a much wider angle, an improved signal-to-noise ratio is obtained for the data signal.

The apparatus is used advantageously for reading data from an optical storage medium comprising a super-resolution near field structure as a non-linear layer. The non-linear layer provides the possibility to read marks and spaces of the optical storage medium being smaller than the diffraction limit of the pickup because the non-linear layer is only sensitive to a small center part of the spot of the laser light on the optical storage medium, which has a sufficiently high intensity for providing the super-resolution effect.

In a first embodiment, the selecting means comprises an annular shaped halve-wave plate arranged between the beam splitter and the objective lens, the halve-wave plate being arranged as an outer section for guiding reflected light passing through the outer section of the objective lens onto the second detector. In addition, a second beam splitter, in particular a polarizing beam splitter, is provided between the first beam splitter and the selecting means being sensitive only to the light passing through the outer section of the halve-wave plate.

In a second embodiment, the selecting means comprises a diffractive optical element for guiding light passing through the outer section of the objective lens onto the second detector. The outer section of the diffractive optical element diffracts the light passing through its outer section by a small angle, for example by an angle within a range of 1°-5°. Only one beam splitter is required for the pickup because the reflected light passing through the outer section of the objective lens is geometrically separated from the reflected light passing through the inner section of the objective lens onto a detector array comprising the first and the second detector. The first and the second detector can be arranged therefore closely together.

In a further embodiment, the objective lens comprises a non-rotational symmetric outer ring section being designed as a selecting means for deflecting reflected light of the optical storage medium by an angle with regard to reflected light passing through the inner section of the objective lens. The outer section is designed such that the focus of the light passing through it is geometrically shifted on a detector array with regard to the focus of the light passing through the inner section of the objective lens. The non-rotational symmetric outer ring section provides therefore a similar function as the diffractive optical element of the second embodiment.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
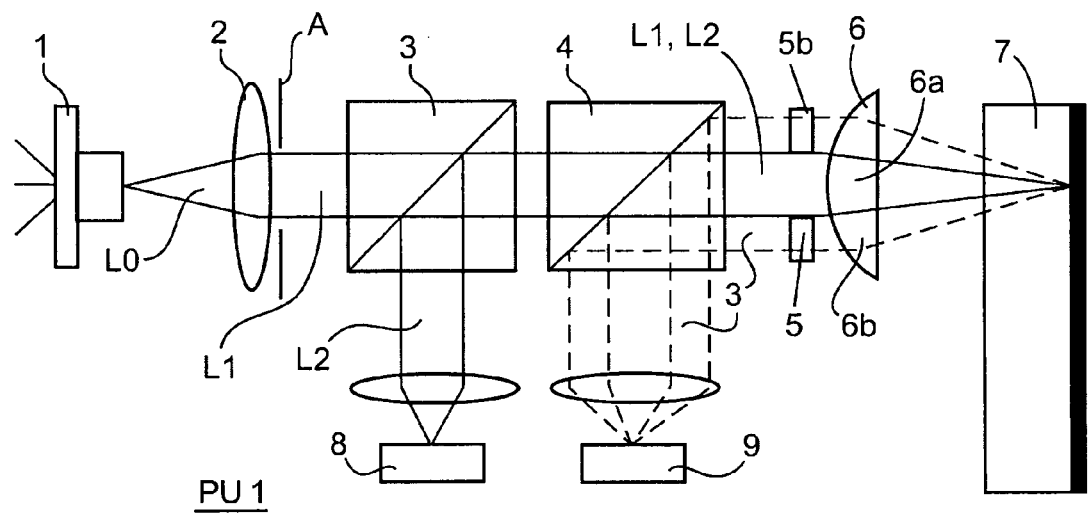
FIG. 1 an apparatus with a pickup comprising an annular shaped halve-wave plate as a selecting means for separating reflected light passing through an outer section of the objective lens.

In FIG. 1 a pickup PU1 is shown in a cross section in a simplified manner, the pickup PU1 comprising a laser 1 as a light source for providing light to be focused by an objective lens 6 of the pickup onto an optical storage medium 7. The laser 1 is for example a blue semiconductor laser diode providing laser light L0 with a wavelength of about 405 nm. The laser light L0 is collimated by a collimator lens 2 for providing a parallel light beam L1 defining an optical axis of the pickup PU1. The light beam L1 passes through a first, non-polarizing beam splitter 3 and a second polarizing beam splitter 4 and then through the objective lens 6. The pickup PU1 is included in an apparatus for reading data from or writing data to the optical storage medium 7.

The first beam splitter 3 is arranged for guiding light L2 reflected from the optical storage medium 7 onto a first optical detector 8 and the second beam splitter 4 is arranged between the first beam splitter 3 and the objective lens 6 for guiding light L3 reflected from the optical storage medium 7 to a second optical detector 9. The second beam splitter 4 is in particular used for guiding reflected light L3 passing through an outer section 6*b* of the objective lens 6 onto the second optical detector 9. This is provided by including a selecting means 5 being arranged between the second beam splitter 4 and the objective lens 6 and having an outer section 5*b* for changing optical properties of the reflected light passing through the outer section 6*b* of the objective lens 6. The outer section 5*b* corresponds essentially with the outer section 6*b* of the objective lens 6.

Figure 2:
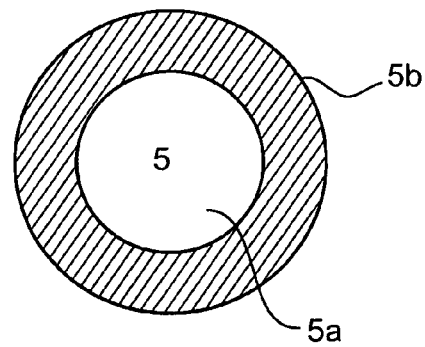
FIG. 2 a selecting means comprising an outer section with an annular shaped halve-wave plate.

The pickup PU1 comprises further an aperture A for the laser beam L1 such that the light beam L1 passes only through the center section 6*a* of the objective lens 6, but not through the outer section 6*b* of the objective lens 6 and the outer section 5*b* of the selecting means 5. The aperture A may be arranged ahead of or after the collimator lens 2 or may be a part of the collimator lens 2. The selecting means 5 has for example an annular shape as shown in FIG. 2 and is constructed such that light passing through the center part 5*a* of the selecting means 5 is not influenced, but only light passing through the outer part 5*b*. The selecting means 5 can be arranged for example together with the objective lens 6, or is arranged close to the second beam splitter 4.

The apparatus is in particular used for operation with a super-resolution near-field structure (Super-RENS) disc and when the light beam L1 impinges on a data layer of the Super-RENS disc 7 for reading of data, a scattering center is formed on the data layer in the center of the focused light beam, which is sensitive to the marks and spaces of the data layer. Only the small center part of the impinging light beam has an intensity being sufficiently high for providing the super-resolution effect, and the respective small aperture will reflect the incident light and some part of the light will be scattered out of the incident light cone. Therefore, the reflected light L3 which is sensitive to the data layer of the optical storage medium 7 has a larger divergence than the incident light beam L1 and is susceptible to a larger numerical aperture of the objective lens 6.

The reflected light L3 with the larger divergence is collected by the outer section 6*b* of the objective lens 6, passing through the outer section 5*b* of the selecting means 5 and is guided by the polarizing beam splitter 4 to the second detector 9 for providing exclusively a high frequency (HF) signal detection of the data of the storage medium 7. The reflected light L2 of the incident beam that is not influenced by the small aperture as provided by the Super-RENS effect is not scattered to this extend and passes therefore mainly through the center part 6*a* of the objective lens 6 and is therefore not influenced by the selecting means 5. This center light is passing through the polarizing beam splitter 4 essentially unaffected and is guided as light beam L2 to the non-polarizing beam splitter 3 and to the first optical detector 8. The light beam L2 as received by detector 8 is used for providing in particular a focus and a tracking error signal for focus and tracking regulation of the pickup PU1, when reading from or writing data to the storage medium 7.

The selecting means is in this embodiment an annular shaped half-wave plate 5 which shifts the linear polarization of the light beam L3 by 90° so that the polarizing beam splitter 4 is effective only for the reflected light L3, which is deflected to the detector 9, but not for the reflected light L2, which is consequently deflected by beam splitter 3 to detector 8.

Figure 3:
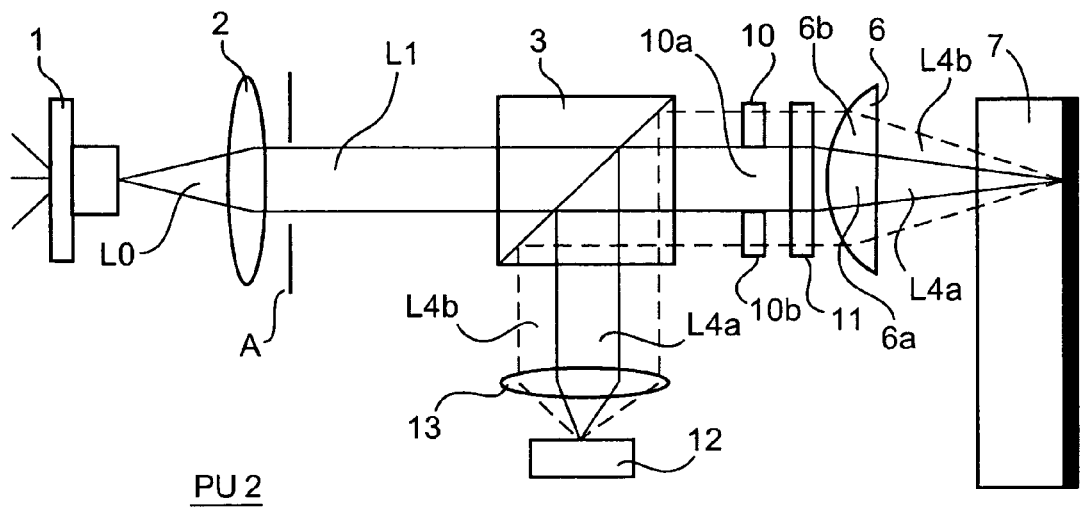
FIG. 3 a second embodiment of the invention comprising a diffractive optical element as a selecting means.

In FIG. 3 a second embodiment with a pickup PU2 is shown in a simplified manner, which comprises a laser 1, a collimator lens 2, an aperture A, a beam splitter 3 and an objective lens 6 for collimating light L0 as provided by the laser 1 and for guiding and focusing light L1 onto a data layer of the optical storage medium 7, as described already with regard to the embodiment shown in FIG. 1. The aperture A limits the laser light L0 to provide a collimated beam L1, which passes only through the center section 6a of the objective lens 6.

Figure 4:
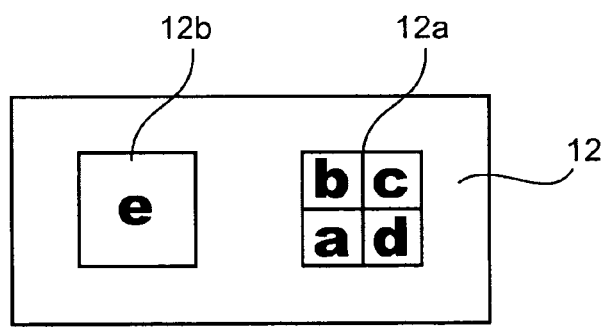
FIG. 4 a detector array comprising a first and a second detector.

The beam splitter 3 is advantageously a polarizing beam splitter in this embodiment having a polarization axis, which is orthogonal to the linear polarized light beam L1 as provided by laser 1, so that the light beam L1 passes essentially unaffected through the beam splitter 3. The polarizing beam splitter 3 deflects reflected light L4a, L4b coming from the storage medium 7 onto an astigmatic focus lens 13 and a detector array 12 comprising a first detector 12a and a second detector 12b. as shown in FIG. 4.

The pickup PU2 comprises further a quarter-wave plate 11 being arranged between the beam splitter 3 and the objective lens 6 and having a size corresponding essentially with the objective lens 6. The quarter-wave plate 11 has the effect that the polarization axis of light L1 and reflected light L4a. L4b is shifted each by 90° with regard to the polarization of the light beam L1, so that the polarization axis of the polarizing beam splitter 3 is effective for the reflected light L4a. L4b.

The pickup comprises further a selecting means 10 being a diffractive element (DOE) arranged between beam splitter 3 and objective lens 6. The DOE has a center part 10a and an outer part 10b with an annular shape as shown in FIG. 2. The outer part 10b includes a linear grating which deflects impinging light by a fixed angle, a small deflection angle α, with regard to the reflected light L4a passing through the center part 10a of the diffractive element 10. The center part 10a does not deflect the light L4b and may be just a hole in the DOE 10. The DOE 10 is arranged close to the objective lens 6 and may be integrated for example together with the quarter-wave plate 11 and the objective lens 6.

The focus lens 13 focuses the light L4a. L4b as deflected by beam splitter 3 onto the detector array 12, light L4a onto the first detector 12a and light L4b onto the second detector 12b. The focus of the light L4b is shifted with regard to the focus of the light L4a on the detector array 12 because of the DOE 11, and the first and second detectors 12a. 12b are arranged correspondingly to receive maximum intensity onto the first detector 12a for light L4a and onto the second detector 12b for light L4b.

The signal of the second detector 12b can be used therefore advantageously as a low noise data signal, in correspondence with the embodiment as described with regard to FIG. 1. The first detector 12a comprises for example four detector fields a-d as shown in FIG. 4 for providing a focus error signal and a push-pull tracking error signal, as known from prior art.

Using a polarizing beam splitter 3 has the advantage that the losses of the light beam L1 can be kept low. Alternatively, a non-polarizing beam splitter 14 may be used for deflecting reflected light coming from the optical storage medium 7 onto the detector array 12. In this case the quarter-wave plate 11 is no more required, which would provide therefore a more cost-effective solution because of the simpler design of the pickup PU2.

The numerical aperture of objective lens 6 as shown in the embodiments of FIGS. 1 and 3 should be as large as possible, for collecting as much as possible of the reflected light of the optical storage medium 7. But an objective lens has to be manufactured with a very high quality if used for high density optical storage media, because a very small focus of the light beam L1 has to be generated on the data layer of the optical storage medium 7 for providing a correspondingly high resolution of the pickup. However, in the embodiment shown in FIGS. 1 and 3, only the center part 6a of the objective lens 6 is effective for focusing the light beam L1 onto the optical storage medium 7. For the outer part 6b. which collects only reflected light L3, respectively light L4a. the lens quality can be lower. The detectors 9 and 12 can be designed for example to take into account a lower quality of the outer section 6b of the objective lens 6 by providing a correspondingly large detector area.

The objective lens 6 may be designed therefore such that the inner section 6a has a numerical aperture of 0,85 or lower and has for example an optical quality with a RMS wavefront error <70 mLambda or even <30 mLambda. The outer section 6b may extend the total numerical aperture of the objective lens 6 to a value of 0,95 or higher, for which outer section a RMS wavefront error <200 mLambda can be sufficient.

Figure 5:
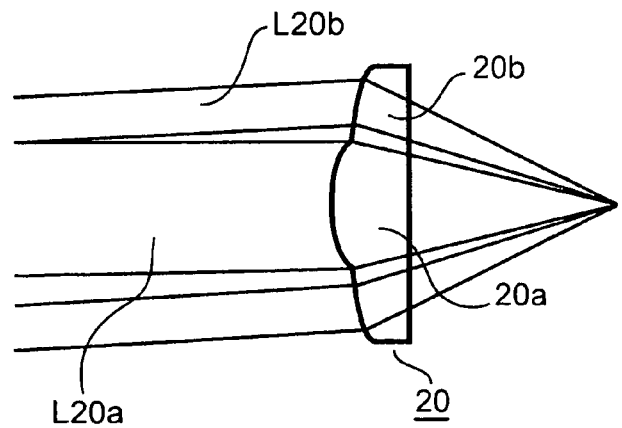
FIG. 5 an objective lens having an inner section and an outer section for shifting light passing through the outer section by a deflection angle with regard to the optical axis of the objective lens.

The optical elements 5, 6 of pickup PU1 and the optical elements 6, 10, 11 of pickup PU2 have in particular rotational symmetry because the light beam L1 and the reflected light beam L3 have essentially rotational symmetry. But as an alternative an objective lens 20 as shown in FIG. 5 may be used having non-rotational symmetry. The objective lens 20 replaces the objective lens 6 and the DOE 10 of the pickup PU2 of FIG. 3. The objective lens 20 of FIG. 5 comprises a rotational symmetric center section 20a and a non-rotational symmetric outer section 20b. The center section 20a is designed for focusing the light beam L1 onto the optical storage medium 7 and collecting light L4a reflected from the optical storage medium 7, as described with regard to FIG. 3. The outer section 20b deflects reflected light L20b passing through the outer section 20b by a small angle α with regard to the reflected light L20a passing through the inner section 20a.

The outer section 20b provides therefore the function of the DOE 10 of pickup PU2 of FIG. 3. The deflection angle a is caused by a non-rotational symmetric design of the geometrical curvature of the outer section 20b to provide for example a deflection angle within a range of 1° -5° with regard to the optical axis of the objective lens 20. The inner section 20a of objective lens 20 has a higher optical quality with regard to the outer section 20b. as discussed already above. The inner section 20a may have a numerical aperture of 0,85 and the outer section 20b may extend the numerical aperture up to 0,95 or more. The light L20b is guided by the polarizing beam splitter 3 onto the second detector 12b for use as a low noise data signal in correspondence with the second embodiment as described with regard to FIG. 3.

The light passing through the outer section 6b of the objective lens 6, respectively section 20b of lens 20, may be used also to provide a push-pull signal for tracking regulation. In combination with the increased numerical aperture of the objective lens as explained above, a push-pull signal can be generated for a shorter track pitch. With a numerical aperture of 0.95. the track-pitch could be reduced by about 12% as compared with a Blu-Ray pickup having a numerical aperture of 0.85. To detect the push-pull signal, the detector section e in FIG. 4 has to be split into two detection fields.

The apparatus of the present invention is designed in particular for use with optical storage media comprising a super-resolution near field structure as a non-linear layer but may be used also for other optical storage media. The foregoing embodiments and accompanying drawings are merely illustrative, but not limitative, and also other embodiments of the invention can be made by a person skilled in the art without departing from the spirit and scope of the present invention. The invention. recites therefore in the claims herein after appended.

The invention claimed is:

1. Apparatus with a pickup for reading data from or writing data to an optical storage medium comprising a nonlinear layer for providing a super-resolution effect, the pickup comprising:
   a laser providing a laser beam,
   an objective lens for focusing the laser beam onto the optical storage medium,
   a first detector for providing a tracking signal and a second detector for providing a data signal,
   a first non-polarizing beam splitter arranged between the laser and the objective lens for guiding light reflected from the optical storage medium onto the first detector, and
   a collimator arranged in the optical path between the laser and the beam splitter for restricting the laser light to a center section of the objective lens, wherein
   a selecting means is arranged in front of the beam splitter, with regard to the reflected light from the optical storage medium, for guiding reflected light passing through an annular outer section of the objective lens onto the second detector, and for guiding reflected light passing through the center section of the objective lens onto the first detector,
   the selecting means comprises a half-wave plate having an annular shaped outer section arranged between the beam splitter and the objective lens, and,
   the pickup comprises a second beam splitter for guiding the light passing through the outer section of the objective lens and the half-wave plate onto the second optical detector, the second beam splitter being a polarizing beam splitter arranged between the first beam splitter and the half-wave plate.

2. Apparatus according to claim 1, wherein the light guided onto the first detector is utilized in addition for providing a focus error signal.

3. Apparatus with a pickup for reading data from or writing data to an optical storage medium comprising a nonlinear layer for providing a super-resolution effect, the pickup comprising:
   a laser providing a laser beam,
   an objective lens for focusing the laser beam onto the optical storage medium,
   a first detector for providing a tracking signal and a second detector for providing a data signal,
   a beam splitter arranged between the laser and the objective lens for guiding light reflected from the optical storage medium onto the first detector, and
   a collimator arranged in the optical path between the laser and the beam splitter for restricting the laser light to a center section of the objective lens, and
   a selecting means arranged in front of the beam splitter with regard to the reflected light from the optical storage medium, between the beam splitter and the objective lens, for guiding reflected light passing through an annular outer section of the objective lens onto the second detector, wherein
   the selecting means comprises a diffractive optical element with an outer section for guiding light of the outer section of the objective lens onto the second detector, the diffractive optical element, and
   the first and the second detector are arranged as one detector array.

4. The apparatus of claim 3, wherein the beam splitter is a polarizing beam splitter and wherein the diffractive optical element comprises a linear grating in the outer section.

5. Apparatus according to claim 4, wherein the selecting means comprises a quarter-wave plate for shifting a polarization component of light passing through the objective lens.

6. Apparatus according to claim 3, wherein the first detector comprises four detection fields for providing a push-pull tracking signal and the second detector comprises a single detection field for providing the data signal.

7. Apparatus with a pickup for reading data from or writing data to an optical storage medium comprising a nonlinear layer for providing a super-resolution effect, the pickup comprising:
   a laser providing a laser beam,
   an objective lens for focusing the laser beam onto the optical storage medium,
   a first detector for providing a tracking signal and a second detector for providing a data signal,
   a beam splitter arranged between the laser and the objective lens for guiding light reflected from the optical storage medium onto the first detector, and
   a collimator arranged in the optical path between the laser and the beam splitter for restricting the laser light to a center section of the objective lens,
   a selecting means arranged in front of the beam splitter, with regard to the reflected light from the optical storage medium, for guiding reflected light passing through an annular outer section of the objective lens onto the second detector, wherein
   the objective lens is a non-rotational symmetric objective lens having an inner ring section and an outer ring section, the outer ring section providing the selecting means for deflecting reflected light of the optical storage medium by an angle with regard to the optical axis of the inner section of the objective lens.

8. The apparatus of claim 7, wherein the deflection angle is within a range of 1-5° with regard to the optical axis of the inner section of the objective lens.

* * * * *